US012770335B2

(12) United States Patent
Wirén et al.

(10) Patent No.: US 12,770,335 B2
(45) Date of Patent: Oct. 20, 2026

(54) ENABLING 3D MODELLING OF AN OBJECT

(71) Applicant: Telefonaktiebolaget LM Ericsson (publ), Stockholm (SE)

(72) Inventors: Richard Wirén, Vantaa (FI); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 770 days.

(21) Appl. No.: 17/786,832

(22) PCT Filed: Dec. 18, 2019

(86) PCT No.: PCT/EP2019/086107

§ 371 (c)(1),
(2) Date: Jun. 17, 2022

(87) PCT Pub. No.: WO2021/121588

PCT Pub. Date: Jun. 24, 2021

(65) Prior Publication Data

US 2023/0351699 A1 Nov. 2, 2023

(51) Int. Cl.
*G06T 19/00* (2011.01)
*G06T 7/30* (2017.01)

(52) U.S. Cl.
CPC ................ *G06T 19/00* (2013.01); *G06T 7/30* (2017.01)

(58) Field of Classification Search
None
See application file for complete search history.

(56) References Cited

U.S. PATENT DOCUMENTS

| | | | | |
|---|---|---|---|---|
| 10,056,001 | B1 * | 8/2018 | Harris | G06T 17/00 |
| 10,192,354 | B2 * | 1/2019 | Terry | G05D 1/0094 |
| 2017/0046873 | A1 * | 2/2017 | Terry | G05D 1/0094 |
| 2018/0041907 | A1 * | 2/2018 | Terry | B64U 20/80 |
| 2018/0144558 | A1 * | 5/2018 | Priest | G06F 16/9537 |
| 2019/0166000 | A1 * | 5/2019 | Luo | H04W 52/0206 |
| 2019/0259198 | A1 * | 8/2019 | Duca | G06F 3/14 |

OTHER PUBLICATIONS

Teng et al., "Aerial Sensing and Characterization of Three-Dimensional RF Fields", (Year: 2016).*

(Continued)

*Primary Examiner* — Hilina K Demeter
(74) *Attorney, Agent, or Firm* — Murphy, Bilak & Homiller, PLLC

(57) ABSTRACT

In an aspect, a method performed by a device (10) of enabling 3D modelling of telecommunication equipment (30) is provided. The method comprises acquiring (S101) visual representations of the telecommunication equipment (30), acquiring (S102), by performing a radio frequency scan of the telecommunication equipment (30) for each acquired visual representation, information indicating a frequency band over which the telecommunication equipment (30) communicates and associating (S103) the acquired information indicating said frequency band with the corresponding acquired visual representations of the telecommunication equipment (30).

22 Claims, 6 Drawing Sheets

(56) References Cited

OTHER PUBLICATIONS

Krig, Scott, "Interest Point Detector and Feature Descriptor Survey", Chapter 6, Computer Vision Metrics: Survey, Taxonomy, and Analysis, Springer, 2014, 217-282.
Krig, Scott, "Local Feature Design Concepts, Classification, and Learning", Chapter 4, Computer Vision Metrics: Survey, Taxonomy, and Analysis, Springer, 2014, 131-189.
Kurz, Daniel, et al., "Inertial sensor-aligned visual feature descriptors", CVPR 2011, Jun. 1, 2011, 161-166.

* cited by examiner

ENABLING 3D MODELLING OF AN OBJECT

TECHNICAL FIELD

The present disclosure relates to methods and devices of enabling 3D modelling of objects.

BACKGROUND

Nowadays, three-dimensional (3D) modelling is commonly used for creating a digital representation of an object from visual data such as captured images.

For instance, in the case of telecommunication equipment, a site such as a cell tower comprising antennae and electronic communications equipment being mounted on the cell tower is typically remotely located and further difficult to access for an operator or maintenance personnel.

Thus, it is highly useful for purposes such as e.g. monitoring, maintenance and planning if a digital representation can be created of the cell tower, and even of individual components of the cell tower.

This may be created by having for instance an unmanned aerial vehicle (UAV), commonly referred to as a drone, circle the tower and capture images from which so called point clouds are extracted such that the digital representation of the cell tower can be created.

Further, when structural changes are made to the cell tower, such as addition of one or more antennae, the created 3D model needs to be updated. However, telecommunication equipment in the form of for instance antennae often have a similar appearance even if the antennae are of different brands and belong to different operators in the same site. This makes it difficult to distinguish one antenna from another upon creating a new digital representation or upon updating an existing digital representation from the extracted cloud points of similar images.

This may be mitigated by exploiting details in surroundings of the radio tower. However, the surroundings typically changes, for instance for seasonal reasons, which has as an effect that surroundings of the digital representation to be created or updated is completely different from the background of the currently captured images utilized for performing the creation of a new digital representation or the update of an existing digital representation.

SUMMARY

An objective is to solve, or at least mitigate, this problem in the art and thus to provide an improved method of enabling 3D modelling of an object.

This objective is attained in a first aspect by a method performed by a device enabling 3D modelling of a telecommunication equipment. The method comprises acquiring visual representations of the telecommunication equipment, acquiring, by performing a radio frequency scan of the telecommunication equipment with each acquired visual representation, information indicating a frequency band over which the telecommunication equipment communicates, and associating the acquired information indicating said frequency band with the corresponding acquired visual representations of the telecommunication equipment.

This objective is attained in a second aspect by a device configured to enable 3D modelling of a telecommunication equipment, the device comprising a camera, a radio frequency transceiver, a processing unit and a memory, said memory containing instructions executable by said processing unit, whereby the device is operative to acquire, with the camera, visual representations of the telecommunication equipment, acquire, by using the transceiver to perform a radio frequency scan of the telecommunication equipment with each acquired visual representation, information indicating a frequency band over which the telecommunication equipment communicates, and to associate the acquired information indicating said frequency band with the corresponding acquired visual representations of the telecommunication equipment.

This objective is attained in a third aspect by a method performed by a device of performing 3D modelling of a telecommunication equipment. The method comprises acquiring keypoints having been extracted from acquired visual representations of the telecommunication equipment, and information indicating a frequency band over which the telecommunication equipment communicates, said information having been acquired by performing a radio frequency scan of the telecommunication equipment for each acquired visual representation, determining whether or not the acquired information associated with one of the acquired visual representations corresponds with the acquired information associated with another one of the acquired visual representations and if so, matching the keypoints extracted from said one of the acquired visual representations to the keypoints extracted from said another one of the acquired visual representations and if the matching is successful, creating a 3D representation of said telecom equipment or updating an existing 3D representation of said telecom equipment utilizing a point cloud formed from the successfully matching keypoints.

This objective is attained in a fourth aspect by a device configured to perform 3D modelling of a telecommunication equipment, the device comprising a processing unit and a memory, said memory containing instructions executable by said processing unit, whereby the device is operative to acquire keypoints having been extracted from captured visual representations of the telecommunication equipment, and information indicating a frequency band over which the telecommunication equipment communicates, said information having been acquired by performing a radio frequency scan of the telecommunication equipment for each acquired visual representation, determine whether or not the acquired information associated with one of the acquired visual representations corresponds with the acquired information associated with another one of the acquired visual representations and if so, match the keypoints extracted from said one of the acquired visual representations to the keypoints extracted from said another one of the acquired visual representations and if the matching is successful, create a 3D representation of said telecom equipment or updating an existing 3D representation of said telecom equipment utilizing a point cloud formed from the successfully matching keypoints.

A device such as for instance a UAV may be used e.g. circle around a cell tower being equipped with a group of antennae. As the UAV circles around the cell tower, it captures images of the antennae from which keypoints subsequently can be extracted and matched to each other in order to form a point cloud serving as a basis for a digital representation of the cell tower.

In addition to capturing images (or video), the UAV acquires frequency spectrum information using radio frequency scanning, the acquired frequency spectrum information indicating which block of the frequency spectrum has been assigned to the respective antenna.

This is advantageous, since for every captured image, the UAV will in addition to the image data also have information indicating the frequency spectrum employed by each antenna.

Subsequently, when keypoints are extracted from the images for matching in order to form point clouds from which a 3D representation of the antennae is created, the frequency spectrum information of each set of keypoints are compared, and if the frequency spectrum information indicates that the keypoints pertain to images captured of different antennae, no matching is performed.

If on the other hand the frequency spectrum information indicates that the keypoints pertain to images captured of the same antennae, the sets of keypoints are matched to each other and it the matching is successful, a 3D representation of the antenna is created utilizing point clouds formed from the successfully matching keypoints.

Advantageously, false matches are avoided. Further, which otherwise ultimately would have resulted in an incorrect 3D representation. Further, if the frequency spectrum information of different sets of keypoints does not correspond no attempt to perform keypoint matching will be undertaken, which saves a huge amount of processing power.

In an embodiment, the device of the second aspect being e.g. a UAV is further being configured to provide the acquired visual representations of the telecommunication equipment and said associated information indicating the frequency band over which the telecommunication equipment communicates to the device of the fourth aspect being e.g. a server.

In an embodiment, the device of the second aspect is further being configured to extract keypoints from each acquired visual representation.

In an embodiment, the device of the second aspect is further being configured to provide the extracted keypoints and said associated information indicating the frequency band over which the telecommunication equipment communicates to the device of the fourth aspect.

In an embodiment, the device of the second aspect is further being configured to determine whether or not the acquired information associated with one of the acquired visual representations corresponds with the acquired information associated with another one of the acquired visual representations and if so, match the keypoints extracted from said one of the acquired visual representations to the keypoints extracted from said another one of the acquired visual representations and if the matching is successful, create a 3D representation of said telecom equipment or updating an existing 3D representation of said telecom equipment utilizing point clouds formed from the successfully matching keypoints.

In an embodiment, the information indicating a frequency band over which the telecommunication equipment communicates being included in a keypoint descriptor utilized during keypoint matching. Thus, an improved descriptor D' is provided not only comprising conventional descriptor D but further the frequency band information Bn of the telecommunication equipment (e.g. an antenna) for which the image was captured: Dn'={Dn, BSn}, where n denotes a number of the image being captured in a set of images.

In an embodiment in case sets of information indicating different frequency bands over which the telecommunication equipment communicates is acquired when performing the radio frequency scan, a set having a highest signal strength is selected.

In an embodiment, the device of the second aspect is further being configured to, when performing the associating, associate information indicating a current pose of the device with respect to the telecommunication equipment with the acquired visual representation and align images taken from different device poses with each other before keypoints are extracted.

In an embodiment, the device of the fourth aspect is further being configured to acquire visual representations of the telecommunication equipment, and for each representation information indicating the frequency band over which the telecommunication equipment communicates for each acquired visual representation, and further when acquiring keypoints to extract the keypoints from each acquired visual representation.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
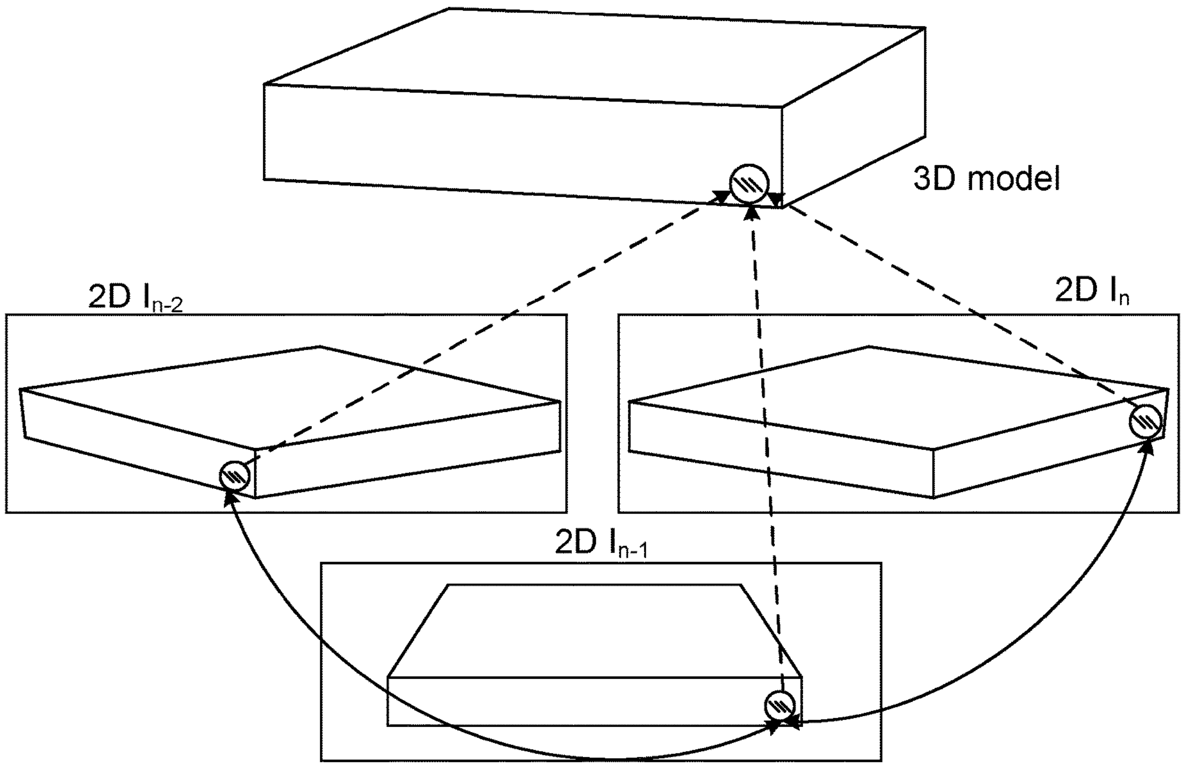
FIG. 1 illustrates three 2D images of telecommunication equipment being merged into a 3D representation of the telecommunication equipment.

FIG. 1 illustrates three two-dimensional (2D) images $I_n$, $I_{n-1}$, $I_{n-2}$ of telecommunication equipment in the form of a baseband unit (BBU) being captured from three different camera poses. Any appropriate device may be used for capturing the images, such as a smart phone. From the three 2D images, a 3D representation of the BBU is created.

This is typically performed in the art by extracting distinct features—so called keypoints, sometime also referred to as interest points—from the object for which the 3D representation is to be created, for instance corners, logotypes, lines, etc. Correspondence between these extracted keypoints is established across the images which allows for estimation of depth of a scene based on triangulation.

Point clouds are formed from the extracted keypoints from which the 3D representation of the BBU is created. Commonly used algorithms include maximally stable extremal regions (MSER), speeded up robust feature (SURF) and scale-invariant feature transform (SIFT).

The approach of creating a 3D representation of an object or scene as described with reference to FIG. 1 relies on three assumptions: A) the object/scene has sufficient amount of distinct structure such that keypoints can be extracted, B) different parts of the object/scene in an image have different visual appearance and can be correctly matched to a corresponding area in a neighbouring image, and C) the object/scene is static, i.e., there are no moving elements and drastic changes that affect large visual areas.

Figure 2:
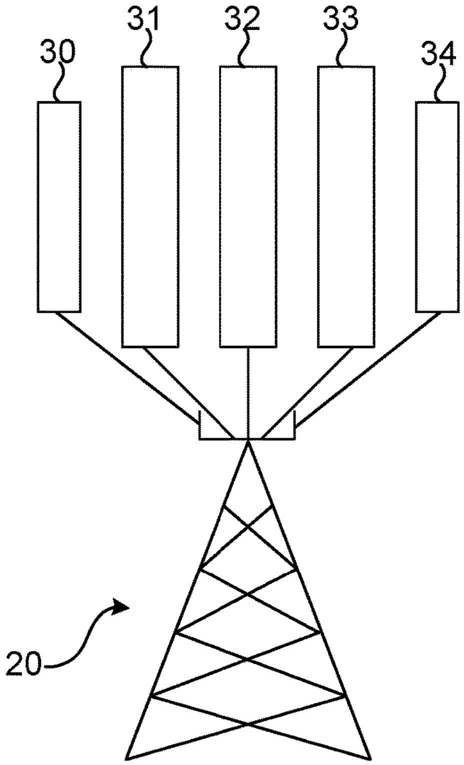
FIG. 2 illustrates an image of a cell tower comprising a plurality of antennae.

FIG. 2 illustrates an image of a cell tower 20 comprising a plurality of antennae 30-34. In such a scenario, the above-stated three assumptions are challenged.

As previously mentioned, telecommunication equipment in the form of for instance antennae often have a similar appearance even if the antennae are of different brands and belong to different operators in the same site.

This makes it difficult to distinguish one antenna from another upon creating a new digital representation or updating an available digital representation since keypoints are difficult to distinguish and may be incorrectly matched, thereby violating condition B.

This may be mitigated by exploiting details in surroundings of the radio tower. However, the surroundings typically change, for instance for seasonal reasons, which has as an effect that surroundings of the digital representation to be updated is completely different from the background of the currently captured images utilized for performing the update. Further, the surroundings may lack useful keypoints. Hence, conditions A and C are violated.

Figure 3:
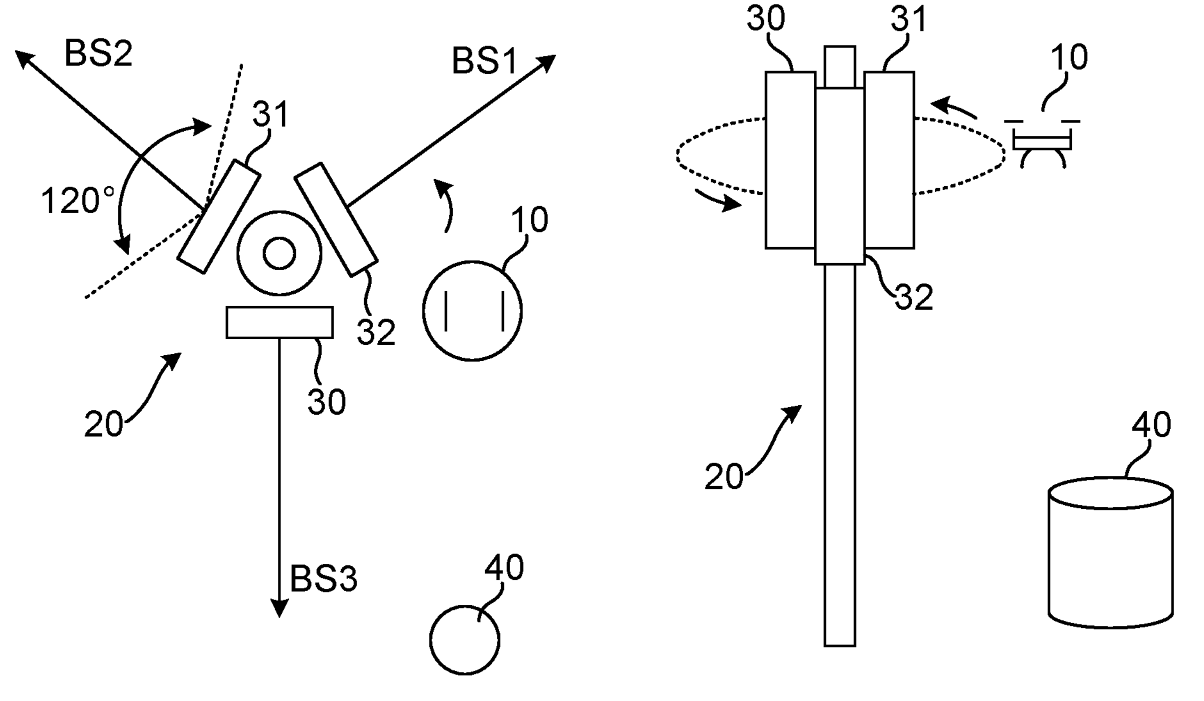
FIG. 3 illustrates an embodiment of a method of a device configured to enable 3D modelling of an object.

FIG. 3 illustrates an embodiment of a method of a device configured to enable 3D modelling of an object, such as telecommunication equipment. In this exemplifying embodiment, the device is embodied in the form of a UAV and the object is embodied in the form of an antenna.

Figure 4:
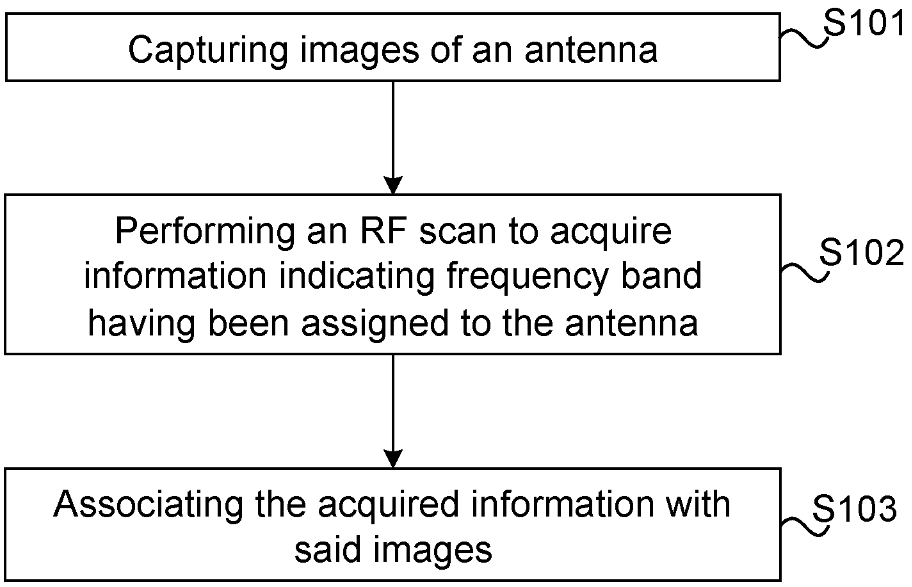
FIG. 4 illustrates a flowchart of a method of a device configured to enable 3D modelling of an object according to an embodiment.

Reference will further by made to FIG. 4 illustrating a flowchart of a method of a device configured to enable 3D modelling of an object.

On a right-hand side of FIG. 3, it is shown in a side view that an UAV 10 circling around a cell tower 20 being equipped with three antennae 30, 31, 32. As the UAV 10 circles around the cell tower 20, it captures images of the antennae from which keypoints subsequently can be extracted and matched to each other in order to form point clouds serving as a basis for a digital representation.

However, in this embodiment, as illustrated on a left-hand side of FIG. 3 showing a top view of the cell tower 20 and the three antennae 30, 31, 32, where the UAV 10 circles the cell tower 20 in a counter-clockwise direction, the UAV 10 will in addition to step S101 of acquiring visual representations of the antennas 30, 31, 32 by capturing images (or video) further in step S102 acquire frequency spectrum information using radio frequency (RF) scanning, the acquired frequency spectrum information indicating which block of the frequency spectrum (referred to in the following as BS) has been assigned to the respective antenna 30, 31, 32.

This is advantageous, since for every captured image, the UAV 10 will in addition to the image data also have information indicating the BS of each antenna 30, 31, 32. That is, for an image captured of the first antenna 30, a corresponding piece of BS information (BS1) is associated with the image in step S103. Similarly, BS2 is associated with an image captured of the second antenna 31, while BS3 is associated with an image captured of the third antenna 32.

In practice, BS1 may e.g. indicate a 713-723 MHz band, BS2 may indicate a 1910-1915 MHz band, while BS3 may indicate a 1915-1920 MHz band. It may be envisaged that that each frequency band is encoded into a particular index number and that a look-up table is used to decode a particular index number into a frequency band; in this example:

| BSn | Band (MHz) |
|---|---|
| 1 | 713-723 |
| 2 | 1910-1915 |
| 3 | 1915-1920 |

It is noted that this is for illustrative purposes only, and in practice, far more frequency bands are available.

Hence, even if at a later stage when the 3D modelling is undertaken, keypoints are extracted from the captured images and a keypoint of an image capturing first antenna 30 is identical to a keypoint of another image capturing second antenna 31 thus potentially resulting in the previously discussed incorrect keypoint matching; this embodiment also acquires the BS information and associates it to each captured image, implying that two more or less identical keypoints pertaining to different antennae may be distinguished from each other by means of the differing BS information for the respective keypoint.

As is understood, the 3D modelling is typically undertaken at for instance a computing device such as a server 40 having far more processing power than the UAV 10.

Thus, keypoint matching is greatly improved, which in its turn greatly improves the point clouds created from the matching keypoints. Ultimately, the 3D representation based on the point clouds will be far more accurate.

In a further advantageous embodiment, passive RF scan is utilized by the UAV 10 to acquire the BS information. Hence, in contrast to an active RF scan, the UAV 10 will not transmit a probe request to the antennae 30, 31, 32 and await a probe response, but will simply wait for the respective antenna to send the information. Advantageously, with the passive scan, the UAV is not required to transmit the probe request to the respective antenna, but will receive the information once the respective antenna transmits the information. This will consume less energy at the UAV as compared to if an active scan would be performed.

The BS information indicating a licensed spectrum block having been assigned to the respective antenna 30, 31, 32 is different for different operators, a first operator is assigned a first block, while a second operator is assigned a second block. Further, equipment of different radio access technologies (RATs) will have different BSs, even it belongs to the same operator. That is, Long-Term Evolution (LTE) equipment has a different BS than equipment operating under Global System for Mobile Communications (GSM), while both LTE and GSM equipment have a different BS than Wideband Code Division Multiple Access (WCDMA) equipment.

In a further embodiment, information indicating pose—i.e. position and orientation—of the UAV 10 is associated with each captured image. Such information may thus be taken into account when extracting keypoints from two or more images of an object taken from different UAV camera poses, thereby aligning the images with each other before any keypoints are extracted.

Figure 5:
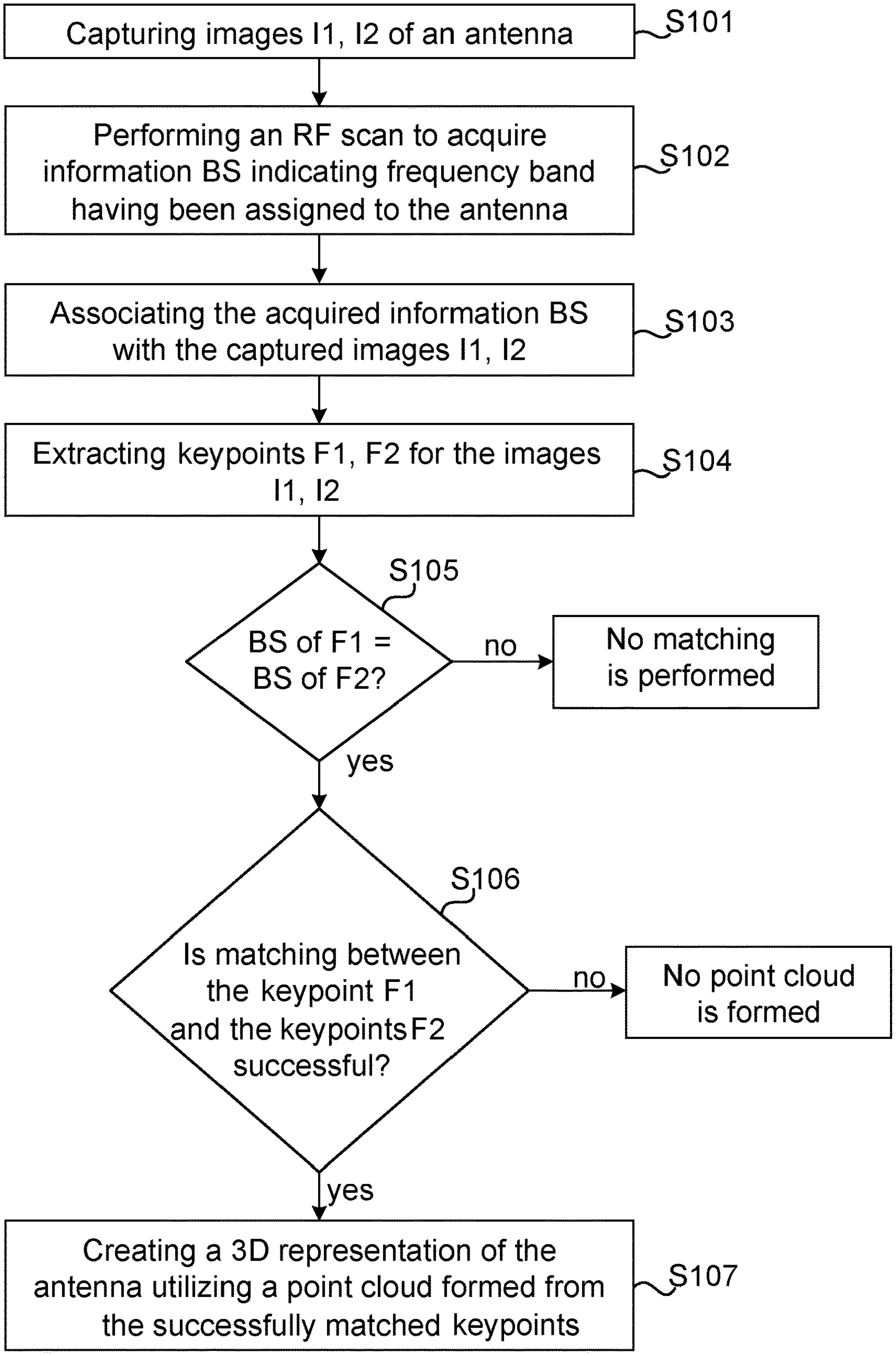
FIG. 5 illustrates a flowchart of a method of a device configured to create a 3D model of an object according to an embodiment.

With reference to FIGS. 3 and 5, in more detail, the UAV 10 circles around cell tower 20 at different heights capturing images (or video) of the antennae 30, 31, 32 in step S101 and acquires the BS information for each captured image in step S102. This results in a set of 2D images $I_{1 \ldots K}$ and an associated set of radio spectrum indicators $BS_{1 \ldots K}$, see step S103.

This data may subsequently be sent to the server 40, which will extract a set of keypoints F for each image $I_K$ and ultimately create a 3D representation of the antennae 30, 31, 32 captured by the images. However, in this exemplifying embodiment, all steps of FIG. 5 are performed by the UAV 10.

As is well known in the art, the keypoints F may be represented by their spatial coordinates within the image and a corresponding local image descriptor D: F={x,y,D}. The descriptor D (a vector with a typical dimensionality of 64) captures local visual statistics in the vicinity of the keypoint, such as scale and orientation of the keypoint. Hence, the descriptor D determines how one keypoint (or a set of keypoints) should be matched to another.

However, in an embodiment, an improved descriptor D' is provided not only comprising the conventional descriptor D but further the frequency band information Bn of the antenna for which the image was captured: Dn'={Dn, BSn}, where n denotes a number of the image being captured in a set of images.

Thus, assuming that a set of keypoints F1 of a first image I1 is to be matched to a set of keypoint F2 of a second image I2, the sets of keypoints F1, F2 being extracted from the respective image I1 and I2 in step S104.

In the art, the UAV 10 would thus make an attempt to match the first set of keypoints F1 of the first image I1 to the second set of keypoints F2 of the first image I2.

Now, if for the first set of keypoints F1 there is a sufficiently good match with the second set of keypoints F2 (using the corresponding descriptors D1 and D2 as guiding information to perform the matching), the first and second images I1, I2 would be considered to contain the same object, and areas in the images corresponding to the respective set of keypoints would be merged together, or combined, to create a 3D representation of the object (in practice a greater number of keypoints would have to be matched before a complete 3D representation of the object can be created.

In practice, the keypoint matching may have to satisfy a matching criteria, for instance that the two sets of keypoint should match each other to 80% for the match to be considered accurate enough. If not, the sets of keypoints are not considered to successfully match each other.

However, with the invention, the process will also take into account the frequency band information BSn of a particular image, which in an example may be included in the improved descriptor Dn'={Dn, BSn}. That is, the improved descriptor Dn' further indicating the frequency band information BSn of a particular image.

This may be performed even before the actual matching of the first set of keypoints F1 and the second set of keypoints F2 is undertaken; if the BS information of the first image I1 does not match the BS information of the second image I2 as determined in step S105, the step of matching is not performed since the two images I1, I2 are indicated to render different antennas. Alternatively, the matching is indeed performed but if a check thereafter reveals that the BS information of the first image I1 does not match the BS information of the second image I2, the matching is considered obsolete (even if it is successful) and the keypoints will not serve as a basis for forming point clouds to create or update a 3D representation. Nevertheless, FIG. 5 illustrates the first of these two possible options.

Hence, assuming that the first image I1 and the second image I2 has the same BS information associated with it, for instance BS1=713-723 MHz, or BS1=1 using the indexed version as determined with the check in step S105. If so, the first set of keypoints F1 and the second set of keypoints F2 indeed originate from images captured of the same object, namely the first antenna 30.

The first set of keypoints F1 are thus matched to the second set of keypoints F2 in step S106, and if the match is successful, i.e. the sets F1, F2 correspond to each other, the matching keypoints will serve as a basis for forming point clouds to create the 3D representation of the antenna 30 in step S107.

However, if on the other hand in step S105 BS1=713-723 MHz is associated with keypoints F1 and BS2=1910-1915 is associated with keypoints F2 (or BS1=1 and BS2=2 respectively using the indexed version) as indicated by the improved descriptor D', the sets of keypoints F1, F2 do not originate from images captured of the same object, which has as an effect that no matching will be performed and thus no point clouds will be extracted.

Now, assuming that the first set of keypoints F1 indeed would have matched the second set of keypoints F2; if the check of step S105 would not have been performed, a false match would have occurred since BS1 indicates that the first set of keypoints F1 pertains to the first antenna 30, while BS2 indicates that the second set of keypoints F2 pertains to the second antenna 31.

Advantageously, with this embodiment a false match is avoided, which otherwise ultimately would have resulted in an incorrect 3D representation. Further, as can be concluded from FIG. 5, if the BS information of one set of keypoints does not correspond to the BS information of another set of keypoints, the UAV 10 will in this embodiment not even attempt to perform the matching, which saves a huge amount of processing power.

Now, as previously described, one could envisage that after the extraction of keypoints in step S104, the process continues directly to the matching step S106 and if there is a successful match, the checking of BS information (cf. step S105) is performed and if it is determined that there is correspondence in BS information for the matching sets of keypoints F1, F2, the 3D representation is created in step S107. This advantageously avoids false matches, but also performs the processing-heavy matching step S107 regardless of whether the BS information of different sets of keypoints corresponds or not.

Figure 6:
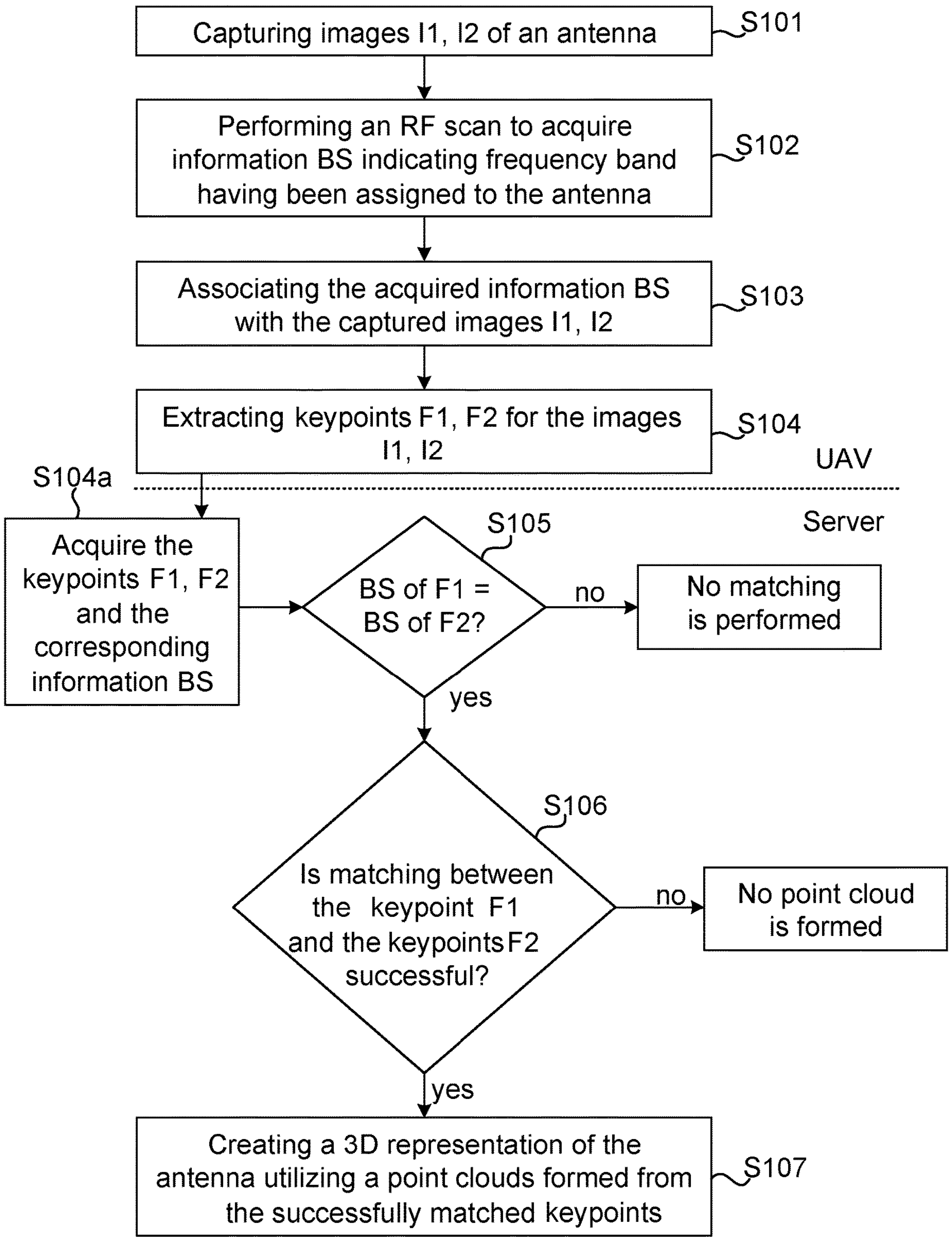
FIG. 6 illustrates a flowchart of a method of two devices interacting to create a 3D model of an object according to an embodiment.

In FIG. 5, the UAV 10 is illustrated to perform all steps S101-S107. However, in a practical implementation with reference to FIG. 6, it may be envisaged that the UAV 10 performs steps S101-S104. In step S104, the UAV 10 will in an embodiment extract keypoints for captured image using for instance visual-inertial simultaneous localization and mapping (VI-SLAM). The UAV 10 may also create the improved descriptor including the BS information: Dn'={Dn, BSn}.

Thereafter, in step S104*a*, the UAV 10 transmits the extracted keypoints and the associated BS information to the server 40 using any appropriate means of communication such as wireless transmission, or by having the server 40 read a storage medium of the UAV 10 where all the extracted keypoints are stored along with the associated BS information. The BS information may be provided to the server 40 from the UAV 10 in the form of the improved descriptor Dn'={Dn, BSn}.

Then, the server 40 performs the determining in step S105 to see whether the BS information of two sets of keypoints to be matched corresponds or not. If so, the two sets of keypoints are matched in step S106 and if the match is successful, the server 40 creates a 3D representation of the first antenna 30 utilizing point clouds formed from the successfully matching keypoints.

Figure 7:
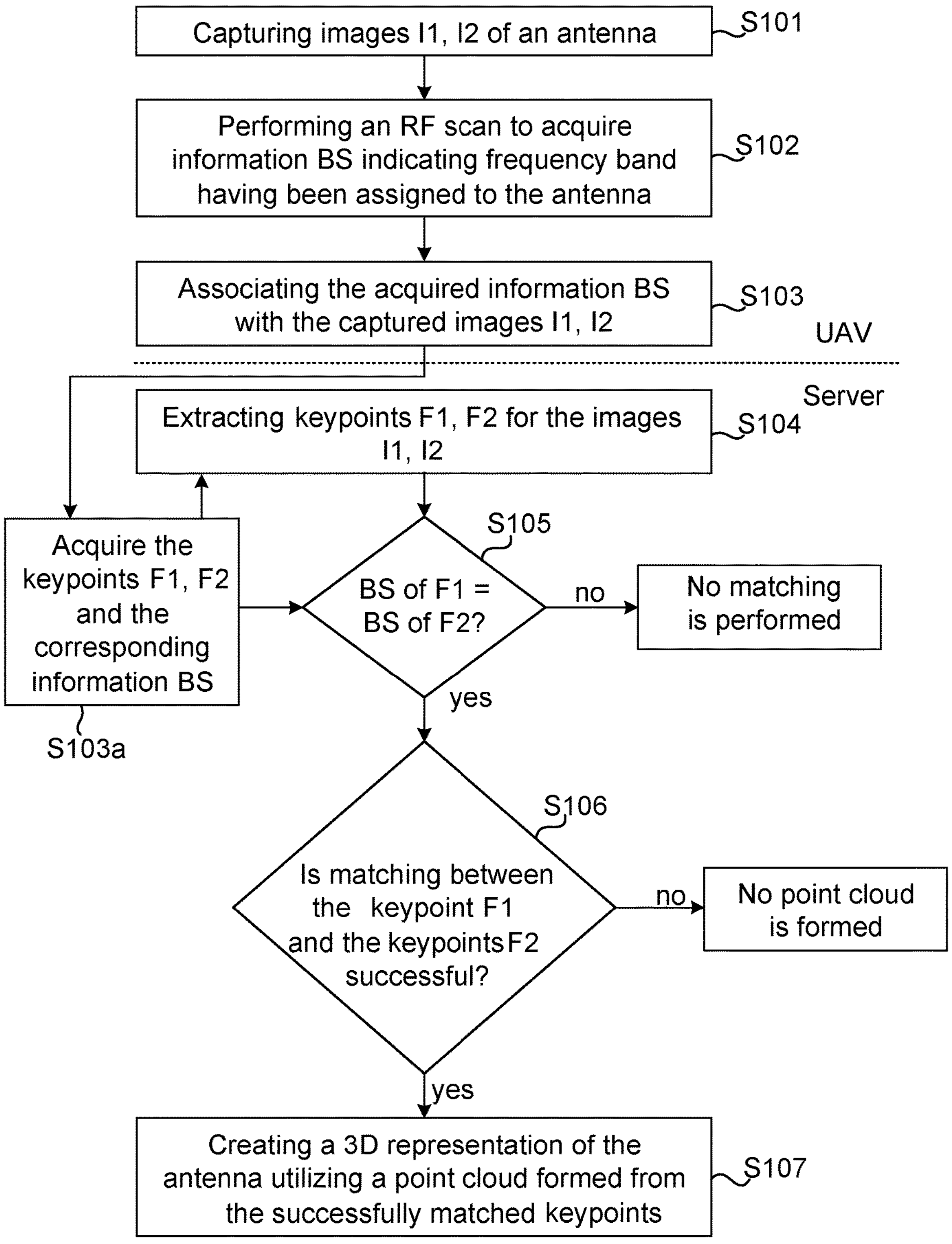
FIG. 7 illustrates a flowchart of a method of two devices interacting to create a 3D model of an object according to another embodiment.

In another practical implementation with reference to FIG. 7, it may be envisaged that the UAV 10 performs steps S101-S103. Thereafter, in step S103*a*, the UAV 10 transmits the images and the associated BS information to the server 40 using any appropriate means of communication such as wireless transmission, or by having the server 40 read a storage medium of the UAV 10 where all the captured images are stored along with the associated BS information.

Then, the server 40 extract keypoints in step S104 for the captured images (and possibly creates the improved descriptor Dn'={Dn, BSn}).

Then, the server 40 performs the determining in step S105 to see whether the BS information of two sets of keypoints to be matched corresponds or not. If so, the two sets of keypoints are matched in step S106 and if the match is successful, the server 40 creates a 3D representation of the first antenna 30 utilizing point clouds formed from the successfully matching keypoints.

In an embodiment, a scenario is envisaged where when the UAV 10 captures images of the antennae 30, 31, 32 of for instance FIG. 3, it may happen that the UAV will receive BS information (BS1, BS2, BS3) of all three antennae upon capturing an image and simultaneously performing an RF scan. It is noted that in practice tens of antennae may be placed close to each other at a cell tower, having as a consequence that a corresponding number of sets of BS information (BS1, . . . , BS10) may be received in a single RF scan.

Thus, the BS information for a captured image may be a histogram $BS_{HIST}$(BS1-SS1, . . . , BS10-SS10), where for each set of BS information received during the RF scan a corresponding signal strength (SS) is measured. When selecting a set of BS information to associated with the captured image, the UAV 10 may select the BS information for which the signal strength is the greatest since that is the antenna that the UAV 10 is most likely to be placed in front of when capturing the image.

The histogram $BS_{HIST}$ may be included in the improved descriptor Dn'={Dn, $BS_{HIST}$}). Again, the BS information for which the signal strength is the greatest would typically be used when utilizing the improved descriptor for matching sets of keypoints.

In an embodiment, visual information and RF information of the improved descriptor is weighted. Assuming that an improved descriptor not using weights has the appearance: D'={v1, v2, BS1, BS2}, where v1 and v2 denotes visual information while BS1 and BS2 denotes the RF information (i.e. the information indicating a frequency band of the telecommunication equipment).

If the visual information and the RF information of the improved descriptor is weighted, for instance with a factor 0.6 and 0.4, respectively, the improved descriptor has the appearance: D'={0.6v1, 0.6v2, 0.4BS1, 0.4BS2}. When matching a first and a second keypoint, the vectors of the improved descriptor of the first keypoint are in practice subtracted from the vectors of the improved descriptor of the second keypoint, in order to assess the closeness of the two keypoints. If the two keypoints are considered close enough, a successful match has occurred.

Hence, with the weighting above, the visual information is given a higher contribution than the RF information in the keypoint matching. This could for instance be done if the weather is bright and clear. To the contrary, in case of for instance clouds or rain, a higher weight could be given to the RF information.

Figure 8:
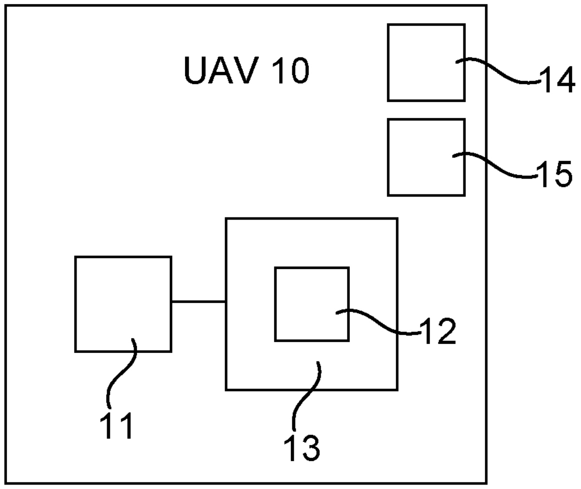
FIG. 8 illustrates a device configured to enable 3D modelling of an object according to an embodiment.

FIG. 8 illustrates a device 10 configured to enable 3D modelling of telecommunication equipment according to an embodiment illustrated by a UAV. The steps of the method performed by the UAV 10 are in practice performed by a processing unit 11 embodied in the form of one or more microprocessors arranged to execute a computer program 12 downloaded to a suitable storage volatile medium 13 associated with the microprocessor, such as a Random Access Memory (RAM), or a non-volatile storage medium such as a Flash memory or a hard disk drive. The processing unit 11 is arranged to cause the UAV 10 to carry out the method according to embodiments when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc. The UAV 10 further comprises a camera 14 for acquitting visual representations of an object by capturing images or videos of the object, and a device such as a receiver or transceiver 15 capable of performing an RF scan of the object, the transceiver 15 possibly also being used for communicating with further devices, such as server 40.

Figure 9:
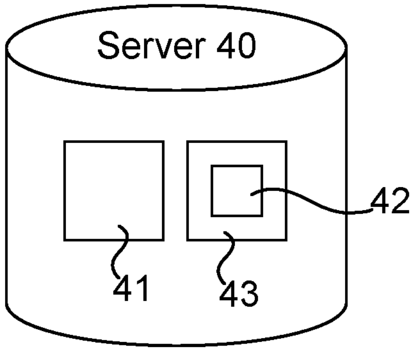
FIG. 9 illustrates a device configured to create a 3D model of an object according to an embodiment.

FIG. 9 illustrates a device 40 configured to perform 3D modelling of telecommunication equipment according to an embodiment illustrated by a server. The steps of the method performed by the server 40 are in practice performed by a processing unit 41 embodied in the form of one or more microprocessors arranged to execute a computer program 42 downloaded to a suitable storage volatile medium 43 associated with the microprocessor, such as a RAM, or a non-volatile storage medium such as a Flash memory or a hard disk drive. The processing unit 41 is arranged to cause the server 40 to carry out the method according to embodiments when the appropriate computer program 42 comprising computer-executable instructions is downloaded to the storage medium 43 and executed by the processing unit 41. The storage medium 43 may also be a computer program product comprising the computer program 42. Alternatively, the computer program 42 may be transferred to the storage medium 43 by means of a suitable computer program product, such as a DVD or a memory stick. As a further alternative, the computer program 42 may be downloaded to the storage medium 43 over a network. The processing unit 41 may alternatively be embodied in the form of a DSP, an ASIC, an FPGA, a CPLD, etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A device configured to enable three-dimensional (3D) modelling of a telecommunication equipment, the device comprising:

a camera;

a radio frequency transceiver; and a processing unit and a memory, said memory containing instructions executable by said processing unit, whereby the device is configured to:

acquire, with the camera, visual representations of the telecommunication equipment;

acquire, by using the radio frequency transceiver to perform a radio frequency scan of the telecommunication equipment for each acquired visual representation, information indicating a frequency band over which the telecommunication equipment communicates; and associate the acquired information indicating said frequency band with the corresponding acquired visual representations of the telecommunication equipment.

2. The device of claim 1, said memory containing instructions executable by said processing unit, whereby the device is further configured to provide, to another device, the acquired visual representations of the telecommunication equipment and said associated information indicating the frequency band over which the telecommunication equipment communicates.

3. The device of claim 1, said memory containing instructions executable by said processing unit, whereby the device is further configured to extract keypoints from each acquired visual representation.

4. The device of claim 3, said memory containing instructions executable by said processing unit, whereby the device is further configured to provide, to another device, the extracted keypoints and said associated information indicating the frequency band over which the telecommunication equipment communicates.

5. The device of claim 3, said memory containing instructions executable by said processing unit, whereby the device is further configured to:

determine whether or not the acquired information associated with one of the acquired visual representations corresponds with the acquired information associated with another one of the acquired visual representations; and based on determining that the acquired information associated with one of the acquired visual representations corresponds with the acquired information associated with another one of the acquired visual representations, match the keypoints extracted from said one of the acquired visual representations to the keypoints extracted from said another one of the acquired visual representations; and based on the matching being successful, create a 3D representation of said telecommunication equipment or updating an existing 3D representation of said telecommunication equipment utilizing a point cloud formed from the successfully matched keypoints.

6. The device of claim 1, wherein the information indicating the frequency band over which the telecommunication equipment communicates is included in a keypoint descriptor utilized during keypoint matching.

7. The device of claim 6, wherein the keypoint descriptor is configured such that one weight is given to visual information included in the keypoint descriptor while another weight is given to the information that indicates the frequency band over which the telecommunication equipment communicates and that is included in the keypoint descriptor.

8. The device of claim 1, said memory containing instructions executable by said processing unit, whereby the device is further configured to, in case sets of information indicating different frequency bands over which the telecommunication equipment communicates is acquired when performing the radio frequency scan, select a set having a highest signal strength.

9. The device of claim 1, said memory containing instructions executable by said processing unit, whereby the device is further configured to:

associate information indicating a current pose of the device with respect to the telecommunication equipment with the acquired visual representation; and align images taken from different device poses with each other before keypoints are extracted.

10. The device of claim 1, wherein the visual representation of the telecommunication equipment comprises an image or video captured by the camera of the device.

11. The device of claim 1, wherein the radio frequency scan comprises a passive scan.

12. A method performed by a device of enabling three-dimensional (3D) modelling of a telecommunication equipment, the method comprising:

acquiring visual representations of the telecommunication equipment;

acquiring, by performing a radio frequency scan of the telecommunication equipment for each acquired visual representation, information indicating a frequency band over which the telecommunication equipment communicates; and associating the acquired information indicating said frequency band with the corresponding acquired visual representations of the telecommunication equipment.

13. The method of claim 12, further comprising extracting keypoints from each acquired visual representation.

14. The method of claim 13, further comprising providing, to another device, the extracted keypoints and said associated information indicating the frequency band over which the telecommunication equipment communicates.

15. The method of claim 13, further comprising:

determining whether or not the acquired information associated with one of the acquired visual representations corresponds with the acquired information associated with another one of the acquired visual representations; and;

based on determining that the acquired information associated with one of the acquired visual representations corresponds with the acquired information associated with another one of the acquired visual representations, matching the keypoints extracted from said one of the acquired visual representations to the keypoints extracted from said another one of the acquired visual representations; and based on the matching being successful, creating a 3D representation of said telecommunication equipment or updating an existing 3D representation of said telecommunication equipment utilizing a point cloud formed from the successfully matched keypoints.

16. The method of claim 12, wherein the telecommunication equipment is an antenna included among a plurality of antennas with which a cell tower is equipped.

17. The method of claim 16, wherein the method comprises, for each of the antennas with which the cell tower is equipped:

acquiring visual representations of the antenna;

performing a radio frequency scan of the antenna to acquire, for each acquired visual representation of the antenna, information indicating a frequency band over which the antenna communicates; and associating the acquired information indicating said frequency band with the corresponding acquired visual representations of the antenna.

18. A method performed by a device of performing three-dimensional (3D) modelling of a telecommunication equipment, the method comprising:

acquiring keypoints having been extracted from acquired visual representations of the telecommunication equipment, and acquiring information indicating a frequency band over which the telecommunication equipment communicates, said information having been acquired by performing a radio frequency scan of the telecommunication equipment for each acquired visual representation;

determining whether or not the acquired information associated with one of the acquired visual representations corresponds with the acquired information associated with another one of the acquired visual representations;

based on determining that the acquired information associated with one of the acquired visual representations corresponds with the acquired information associated with another one of the acquired visual representations, matching the keypoints extracted from said one of the acquired visual representations to the keypoints extracted from said another one of the acquired visual representations; and if said matching is successful, creating a 3D representation of said telecommunication equipment or updating an existing 3D representation of said telecommunication equipment utilizing a point cloud formed from the successfully matching keypoints.

19. A device configured to perform three-dimensional (3D) modelling of a telecommunication equipment, the device comprising a processing unit and a memory, said memory containing instructions executable by said processing unit, whereby the device is configured to:

acquire keypoints having been extracted from captured visual representations of the telecommunication equipment, and acquire information indicating a frequency band over which the telecommunication equipment communicates, said information having been acquired by performing a radio frequency scan of the telecommunication equipment for each acquired visual representation;

determine whether or not the acquired information associated with one of the acquired visual representations corresponds with the acquired information associated with another one of the acquired visual representations;

based on determining that the acquired information associated with one of the acquired visual representations corresponds with the acquired information associated with another one of the acquired visual representations, match the keypoints extracted from said one of the acquired visual representations to the keypoints extracted from said another one of the acquired visual representations; and if said matching is successful, create a 3D representation of said telecommunication equipment or updating an existing 3D representation of said telecommunication equipment utilizing a point cloud formed from the successfully matching keypoints.

20. The device of claim 19, said memory containing instructions executable by said processing unit whereby the device is further configured to:

acquire visual representations of the telecommunication equipment, and for each acquired visual representation, acquire information indicating a frequency band over which the telecommunication equipment communicates, said information having been acquired by performing the radio frequency scan of the telecommunication equipment for each acquired visual representation, and extract the keypoints from each acquired visual representation.

21. The device of claim 19, wherein the information indicating the frequency band over which the telecommunication equipment communicates is included in a keypoint descriptor utilized during keypoint matching.

22. The device of claim 21, wherein the keypoint descriptor is configured such that one weight is given to visual information included in the keypoint descriptor while another weight is given to the information that indicates the frequency band over which the telecommunication equipment communicates and that is included in the keypoint descriptor.

* * * * *